United States Patent
Powers et al.

(10) Patent No.: US 10,272,743 B2
(45) Date of Patent: Apr. 30, 2019

(54) COWL AIR/WATER SEPARATOR DRAIN FOR AUTOMOBILE

(71) Applicant: Honda Motor Co., Ltd., Minato-ku, Tokyo (JP)

(72) Inventors: Marc J. Powers, Marysville, OH (US); Christopher R. Freeman, Dublin, OH (US); Junichi Kanemaru, Columbus, OH (US); Hirotomo Yamada, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 761 days.

(21) Appl. No.: 14/668,332

(22) Filed: Mar. 25, 2015

(65) Prior Publication Data
US 2016/0280042 A1    Sep. 29, 2016

(51) Int. Cl.
 *B60H 1/30* (2006.01)
 *B60H 1/28* (2006.01)
 *B62D 25/08* (2006.01)

(52) U.S. Cl.
 CPC ............. *B60H 1/28* (2013.01); *B62D 25/081* (2013.01)

(58) Field of Classification Search
 CPC .............................. B60H 1/28; B62D 25/081
 USPC ........................................................ 454/174
 See application file for complete search history.

(56) References Cited

U.S. PATENT DOCUMENTS

| | | | |
|---|---|---|---|
| 3,205,808 A | 9/1965 | Barr | |
| 4,819,550 A * | 4/1989 | Ioka | B60H 1/28 454/147 |
| 5,022,479 A | 6/1991 | Kiser et al. | |
| 5,139,458 A * | 8/1992 | Koukal | B60H 1/28 454/147 |
| 5,145,457 A * | 9/1992 | Tanigaito | B60H 1/28 296/192 |
| 5,679,074 A * | 10/1997 | Siegel | B60H 1/28 454/147 |
| 6,086,144 A * | 7/2000 | Kuwano | B62D 25/081 296/192 |
| 6,347,989 B1 * | 2/2002 | Marko | B60H 1/28 454/111 |
| 6,514,136 B1 * | 2/2003 | Hanaya | B60K 15/035 180/68.3 |
| 6,955,593 B2 * | 10/2005 | Lewis | B60H 1/28 454/146 |
| 7,000,979 B2 * | 2/2006 | Borkowski | B62D 25/081 296/192 |
| 7,197,885 B2 * | 4/2007 | Kozak | B60H 1/00028 62/283 |
| 7,275,985 B2 | 10/2007 | Lewis et al. | |
| 7,976,097 B2 * | 7/2011 | Watanabe | B62D 25/081 296/192 |

(Continued)

*Primary Examiner* — Helena Kosanovic
(74) *Attorney, Agent, or Firm* — Arent Fox LLP

(57) ABSTRACT

An air/water separator drain assembly is provided in a vehicle. The assembly includes a first opening (HVAC intake) beneath a cowl through which air proceeds for use in an environmental control system of the vehicle. A second opening or main drain opening is provided for draining water from the cowl in a first direction. A channel is disposed adjacent the drain opening for collecting water from the cowl. Auxiliary openings in the channel are smaller than the drain opening for removing water from the channel and from adjacent the drain opening.

15 Claims, 6 Drawing Sheets

(56) References Cited

U.S. PATENT DOCUMENTS

| | | | |
|---|---|---|---|
| 8,696,049 B2 * | 4/2014 | Hagino | B60H 1/28 296/192 |
| 9,108,490 B2 * | 8/2015 | Bergholtz | B60H 1/28 |
| 2008/0246311 A1 * | 10/2008 | Hagino | B60H 1/28 296/192 |
| 2014/0017987 A1 * | 1/2014 | Andersson | B60H 1/28 454/147 |

* cited by examiner

COWL AIR/WATER SEPARATOR DRAIN FOR AUTOMOBILE

BACKGROUND

The present disclosure relates to a cowl design, and more particularly a cowl that directs water flow to drain holes around a main drain opening.

In prior designs, the cowl top usually has vent openings that can potentially become clogged, for example with snow or leaves. A problem may arise with water drainage. In addition, the snow or leaves may also impact an airflow path through the vent openings in the cowl to an HVAC intake opening situated under the cowl. As a result of melting snow and under normal circumstances, water drains out of the main drain opening or hole without issue. However, the region around the drain opening in the cowl will fill with water, for example from melting snow, and if a main air pathway is blocked by snow when the HVAC blower is powered on, vacuum pressure exerted by the HVAC blower will draw or pull air through the main drain opening and toward the HVAC intake. The air velocity through the main drain opening is strong enough to pick up water droplets from the drain opening and the surrounding area, and carry the water droplets into the HVAC intake. The airflow directed through the drain opening in the opposite direction as water passing through the drain opening is also strong enough to prohibit water from draining therethrough.

In prior designs, the drain opening is often located inside or adjacent a fender area of the automotive vehicle and the spacing relative to the HVAC intake is sufficient such that the potential for moisture entering the HVAC intake from the drain opening is not a problem. However, newer designs locate the drain openings more closely adjacent the HVAC intake.

Accordingly, a solution is required to address situations, such as the cowl becoming blocked and the normal air path to the HVAC being blocked, where air enters through the drain opening at a high velocity, and thereby forces water to stay in the dash upper and eventually enters into the HVAC unit through the HVAC intake beneath the cowl.

SUMMARY

An air/water separator drain assembly is a vehicle includes an HVAC intake opening beneath an associated cowl through which air proceeds for use in the associated vehicle. A drain opening drains water from the cowl in a first direction, and a channel adjacent the drain opening for collecting water from the cowl. At least one auxiliary opening in the channel is smaller than the drain opening for removing water from the channel and from adjacent the drain opening.

The assembly further includes plural auxiliary openings and each of the auxiliary openings is smaller than the drain opening.

The auxiliary opening is located along a periphery of the drain opening.

The auxiliary opening is dimensioned so that water collecting over the auxiliary opening overcomes the force of air in a second direction opposite the first direction when air flow to the HVAC intake opening is blocked.

The channel has a depth that cooperates with the dimension of the auxiliary opening to assure drainage of water therethrough and thereby limit a potential for moisture to enter the HVAC intake opening.

A method of separating air and water beneath a cowl includes providing an intake of a HVAC system beneath the cowl, providing a drain opening that serves a dual purpose of (i) draining water from a region of the cowl and (ii) forming part of a secondary airflow path when a primary airflow path to the HVAC intake is at least partially blocked, and providing at least one auxiliary opening adjacent the drain opening that allows water to drain from the cowl region when the primary airflow path to the HVAC intake is at least partially blocked and the drain opening is used as part of the secondary airflow path.

The drain opening drains water from the cowl region in a first direction and forms part of the secondary airflow path in an opposite, second direction.

The method further includes sizing the at least one auxiliary opening to avoid water buildup around the drain opening.

The sizing step includes forming an area of the auxiliary openings and/or depth of a channel that receives the auxiliary opening to overcome a force resulting from airflow in the direction of the secondary airflow path when the primary airflow path is at least partially blocked.

The method includes positioning a blocker in the secondary airflow path between the drain opening and the HVAC intake.

The method includes forming a groove at least partially around the drain opening for water to avoid the drain opening and communicating with auxiliary openings located in the groove.

A primary benefit is the ability to effectively drain water from beneath a cowl and preventing moisture entrainment into the HVAC intake under selected circumstances.

Another advantage relates to handling water when material such as snow, leaves, etc. impact a primary air flow path.

Other benefits and advantages of the present disclosure will become more apparent from reading and understanding the following detailed description.

DETAILED DESCRIPTION

Figure 1:
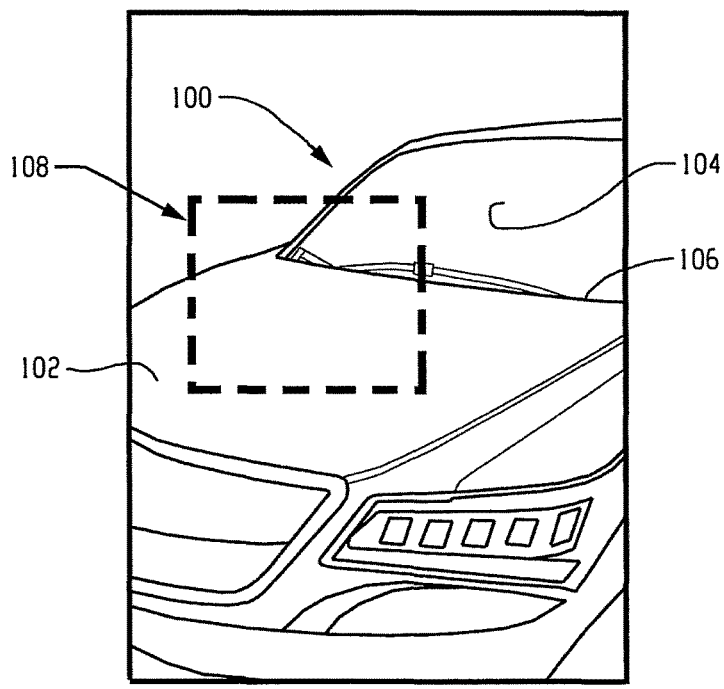
FIG. 1 is a perspective view of an automotive vehicle, and particularly detailing the cowl region between the hood and windshield.
Figure 2:
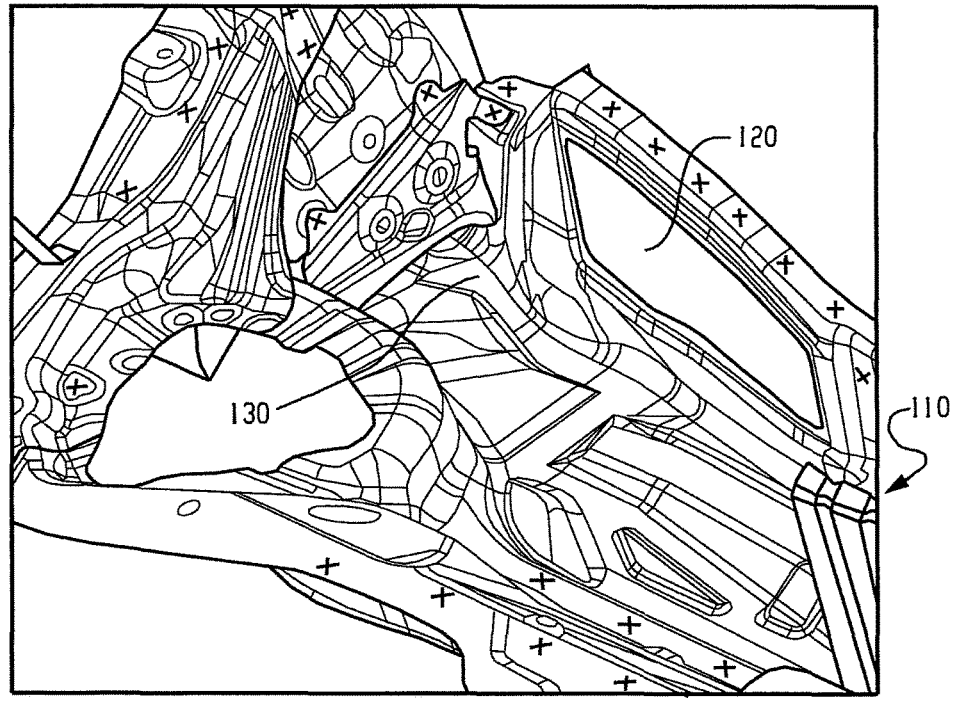
FIG. 2 is a perspective view of the support structure of the cowl region in the encircled region from FIG. 1.

Turning to FIG. 1, there is shown a portion of an automotive vehicle 100 and more specifically, hood 102, windshield 104, and an interconnecting region or cowl 106. An underlying cowl support structure 110 beneath the hood 102 in encircled region 108 adjacent the windshield 104 is more particularly illustrated in FIGS. 2-5. As will be appreciated and understood by one skilled in the art, other components receive about the security been removed for ease of illustration. Generally speaking, the encircled region 108 in FIG. 2 is beneath the cowl 106 and adjacent a fender in a rear corner of the hood 102. The cowl support structure 110 includes an opening 120 were and HVAC intake is mounted. Thus, with the cowl 106 removed from FIG. 2, it is apparent that the HVAC intake opening 120 is positioned adjacent a drain opening 130.

Figure 3:
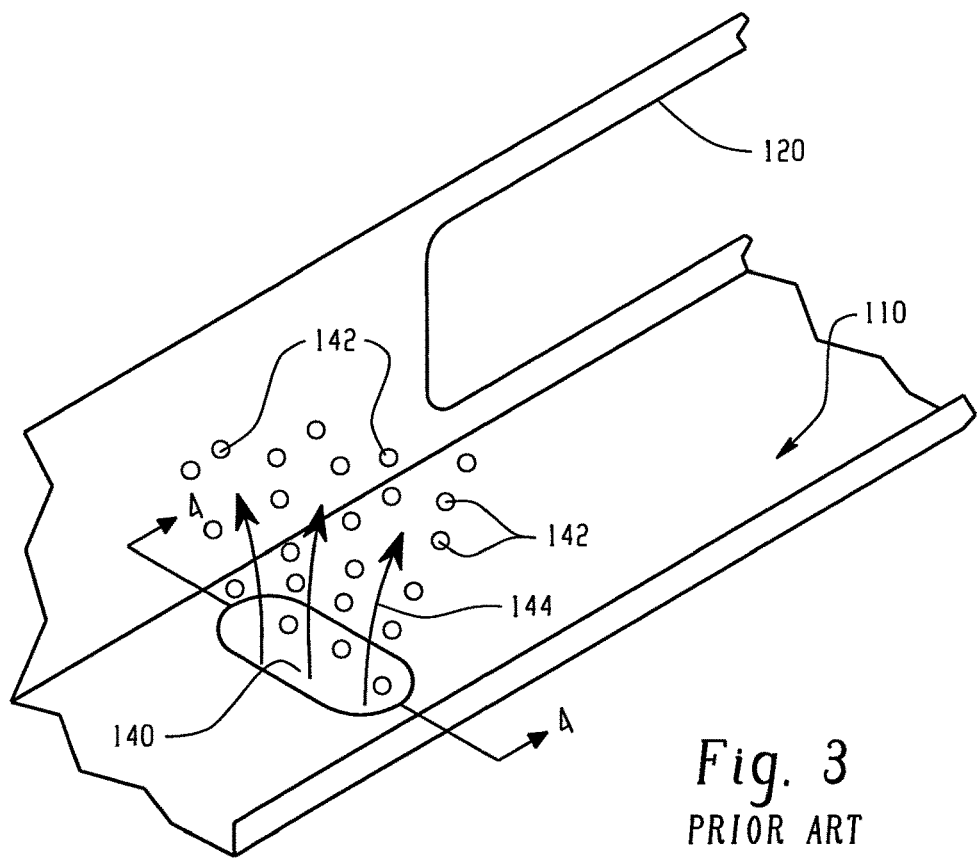
FIG. 3 is an enlarged perspective view showing the subject cowl air/water separator drain arrangement.
Figure 4:
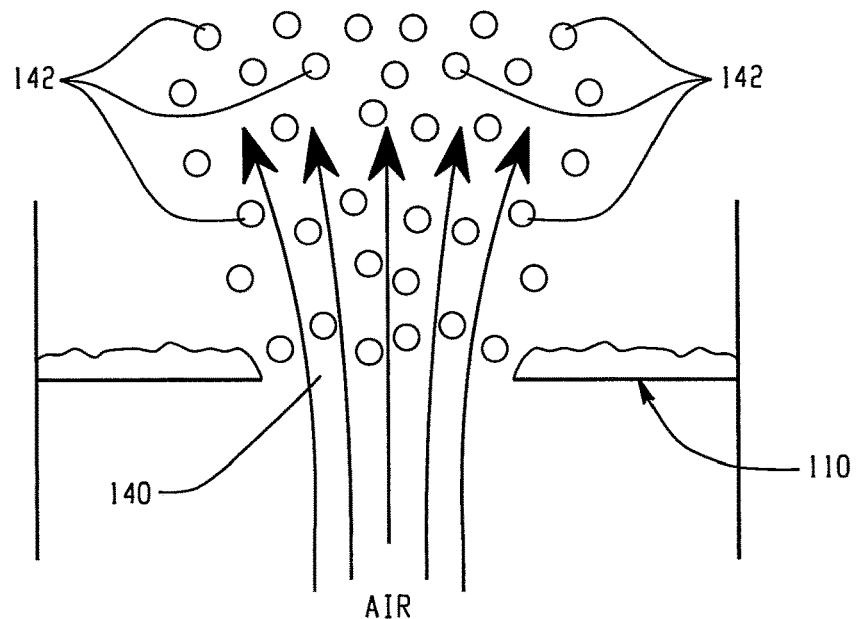
FIG. 4 is an enlarged perspective view taken generally in the direction of reference arrows 4-4 of FIG. 3.
Figure 5:
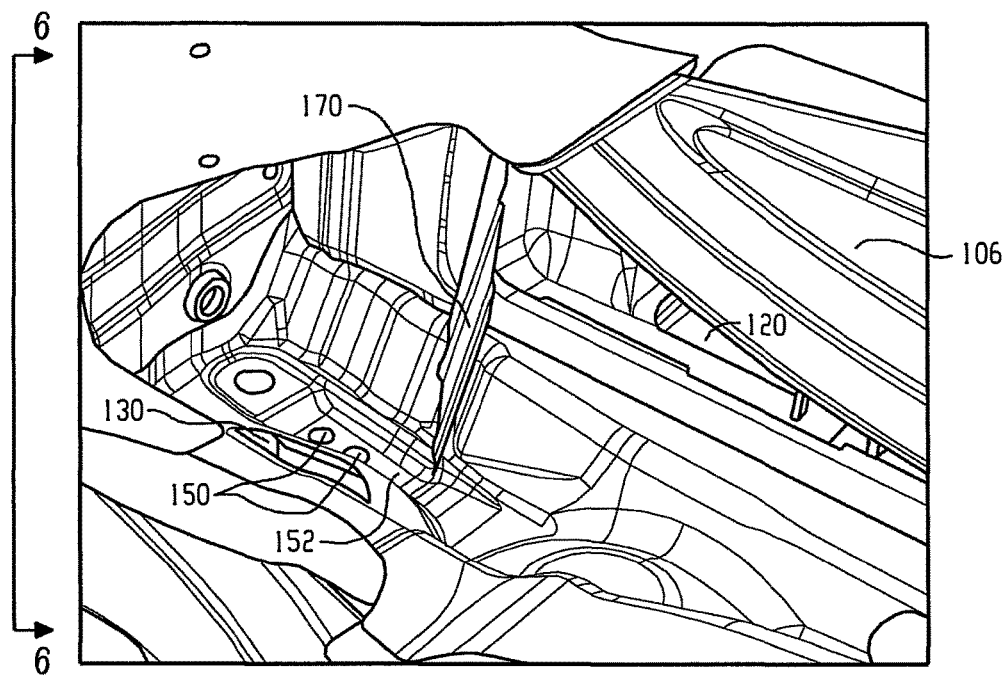
FIG. 5 is a perspective view of the different airflow and water pathways beneath the cowl.
Figure 6:
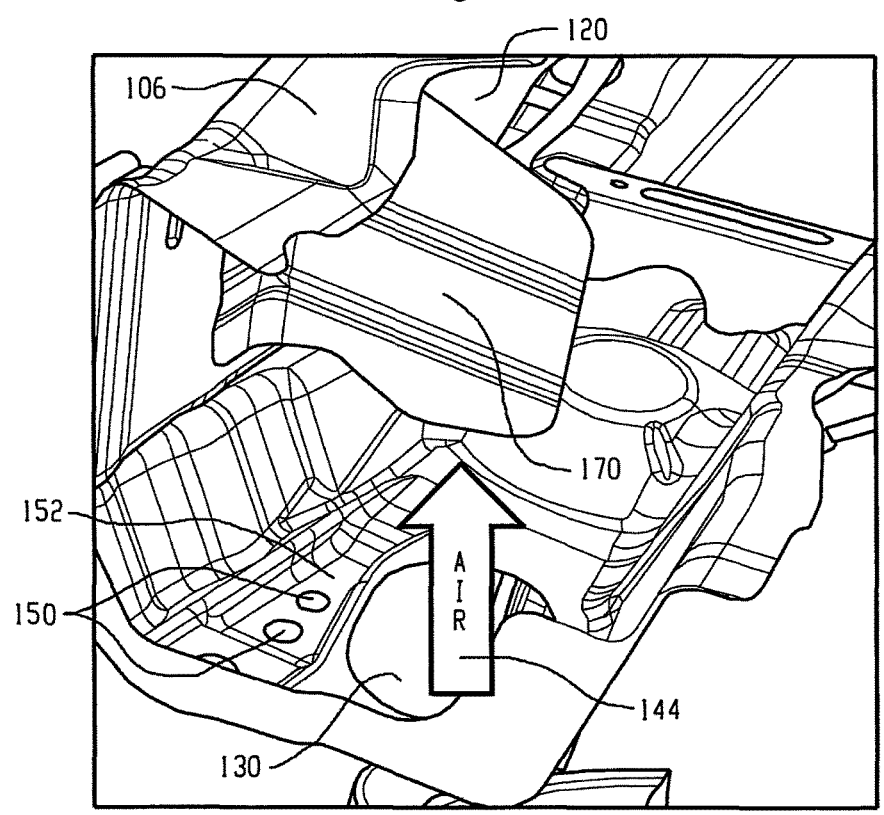
FIG. 6 is an enlarged perspective view of the cowl air/water separator drain.
Figure 7:
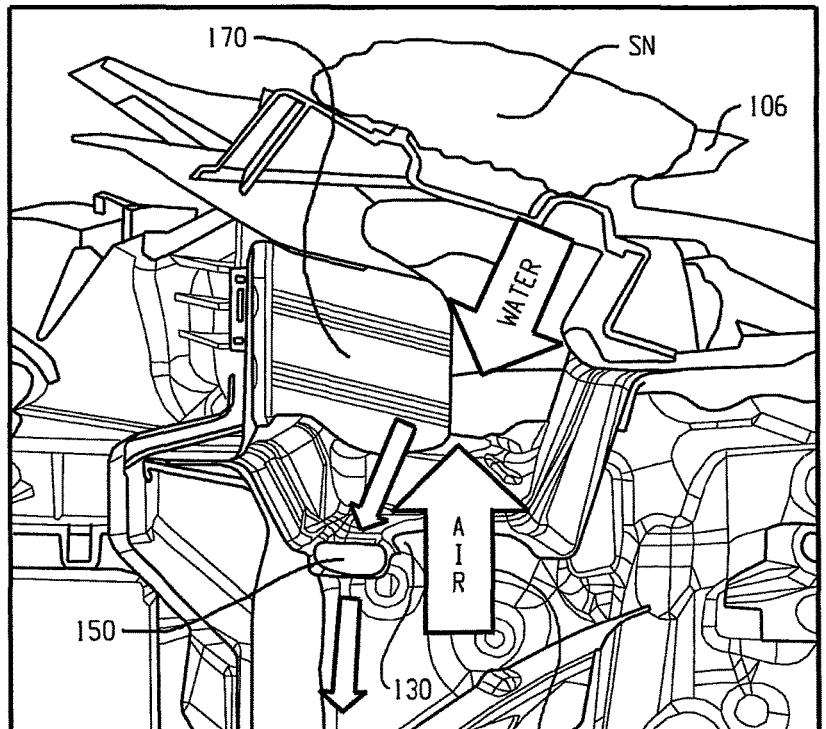
FIG. 7 is a schematic representation of the prior problem.
Figure 8:
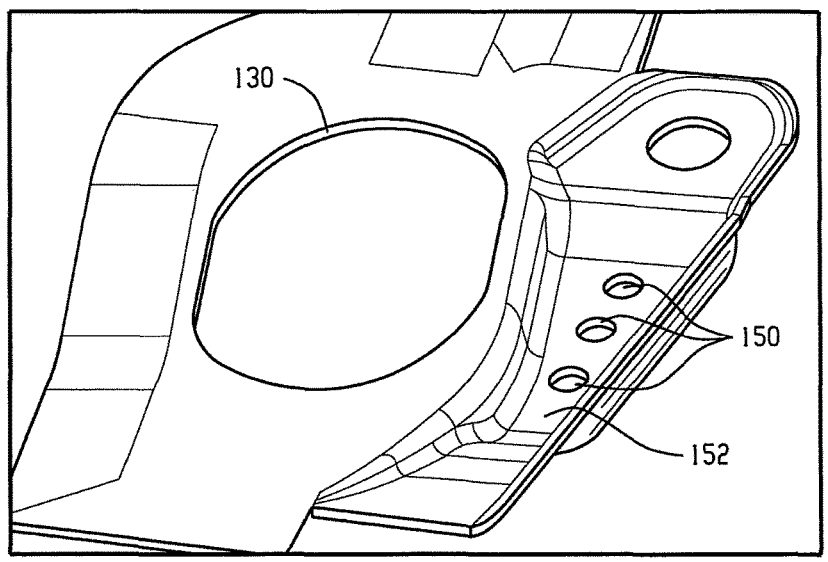
FIG. 8 is a cross-sectional view taken generally along the lines 8-8 of FIG. 7.
Figure 9:
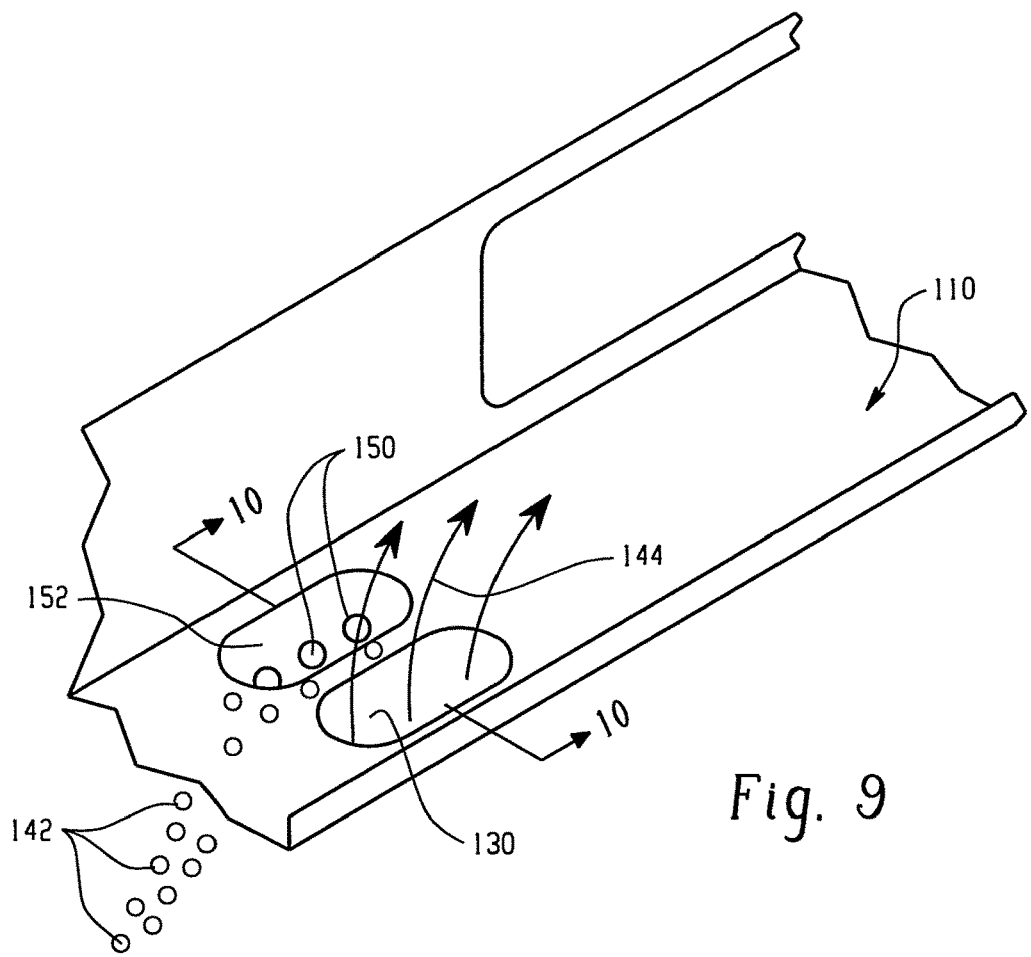
FIG. 9 is a schematic representation of the solution to the prior problem provided by the cowl air/water separator drain.
Figure 10:
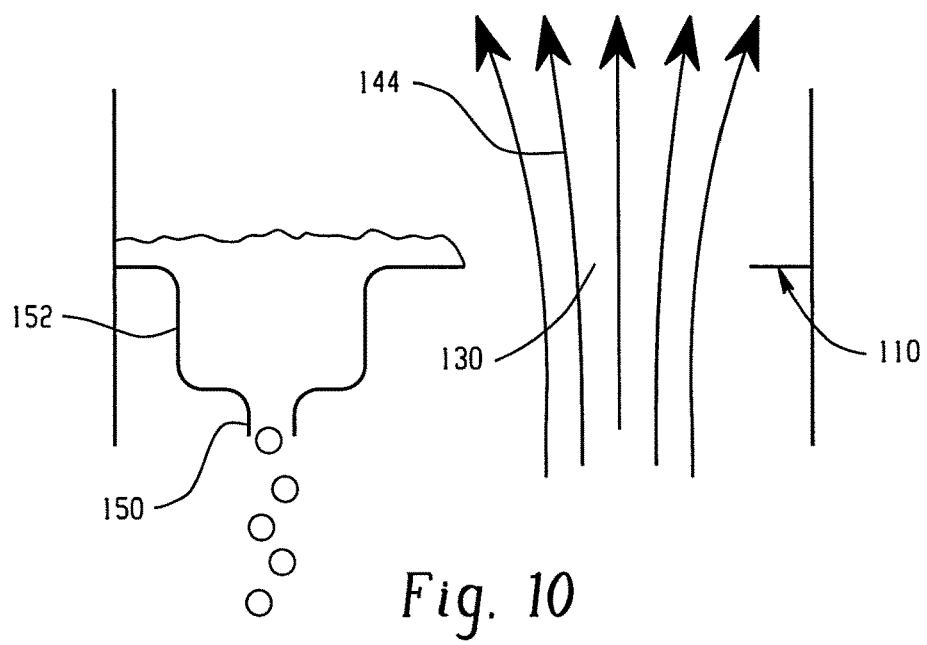
FIG. 10 is a cross-sectional view taken generally along the lines 10-10 of FIG. 9.

In prior arrangements illustrated in FIGS. 3 and 4, an enlarged drain opening 140 was provided for removing water from this region of the vehicle. If snow or leaves, for example, collected in the cowl 106 and blocked a primary airflow path to the HVAC intake opening 120, water headed outwardly through the drain opening 140 could reverse its course and become water droplets 142 when the HVAC blower was turned on are actuated. Airflow represented schematically by reference arrows 144 in FIGS. 3 and 4, would be drawn through the drain opening 140, contact water intending to pass downwardly through the drain opening and become water droplets 142 that could be drawn into the HVAC intake 120. Snow clogged the cowl top and as the snow melted, the water would flow toward the side drain openings 140. Alternatively, leaves could also clog the cowl top and rainwater would pass through or under the leaves and flow toward the drain opening 140. Because the cowl top is blocked, air 144 enters upwardly through the drain openings 140 (FIGS. 3 and 4) at a high velocity thereby forcing the water droplets 142 to stay in the dash upper and eventually flow into the HVAC intake opening 120.

FIGS. 5-10 illustrates one embodiment that resolves this problem. Specifically, the first war enlarged drain opening 130 is maintained. In addition, at least one and perhaps multiple auxiliary or second opening(s) 150 is(are) provided adjacent the drain opening 130. The auxiliary openings 150 are preferably smaller in size than the main drain opening 130. Under the scenario described above were snow (SN in FIG. 7) and/or leaves clogged the primary airflow path to the HVAC intake 120, water will collect in a channel or groove 152 disposed adjacent to the main drain opening 130. The channel 152 collects the water and the smaller, auxiliary openings 150 are provided in a lower region of the channel. The auxiliary openings 150 are also subjected to the airflow 144 when the HVAC blower is turned on. However, the smaller dimension of the auxiliary openings 150 provides a cohesive effect that requires an increased separation force for the water to be dislodged from the smaller openings. As water collects in the channel 152, an increased head (downward force) develops over the auxiliary openings 150. This allows the water to continue to drain through the auxiliary openings 150—either intermittently or continuously—until such time as the water is drained completely from the channel 152 via the auxiliary openings or the upward airflow through the auxiliary openings temporarily prevents further water drainage until more water collects in the channel.

It is also contemplated that a physical barrier or wall 170 be interposed between the drain opening 130 and the HVAC intake opening 120. As particularly illustrated in FIGS. 5-7, the wall 170 at least partially extends into a secondary airflow path established between the drain opening 130 and the HVAC intake when snow/leaves clog the primary airflow path. As represented by reference numeral 144 in FIGS. 6-7, air flows through the drain opening 130 in the opposite direction of water flow when a clog or obstruction occurs as described above. Without the auxiliary openings 150, water droplets could develop and be carried by or entrained in the airflow 144. There is also the possibility that water around the drain opening 130 could still become entrained in the airflow when auxiliary openings 150 are provided. The water droplets would fall out if the airflow 144 contacts wall 170, or the wall at least makes it more difficult for the water droplets to remain suspended in the secondary airflow path directed toward the HVAC intake opening 120.

Figure 11:
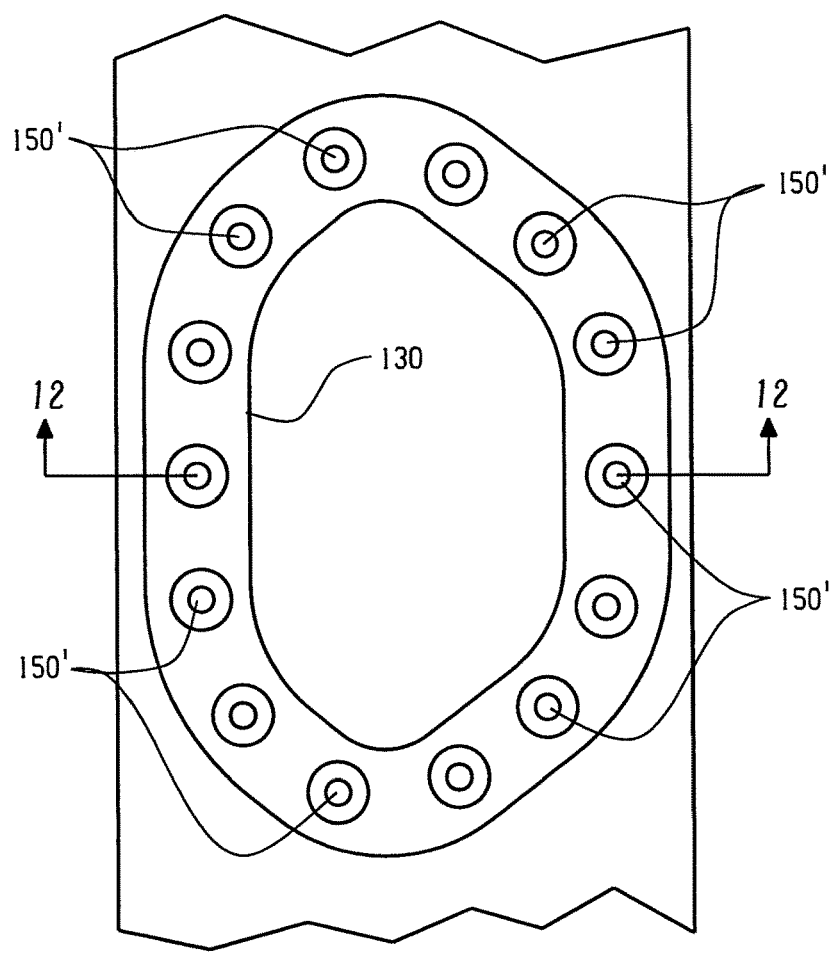
FIG. 11 is a top, plan view of another embodiment of a cowl air/water separator drain.
Figure 12:
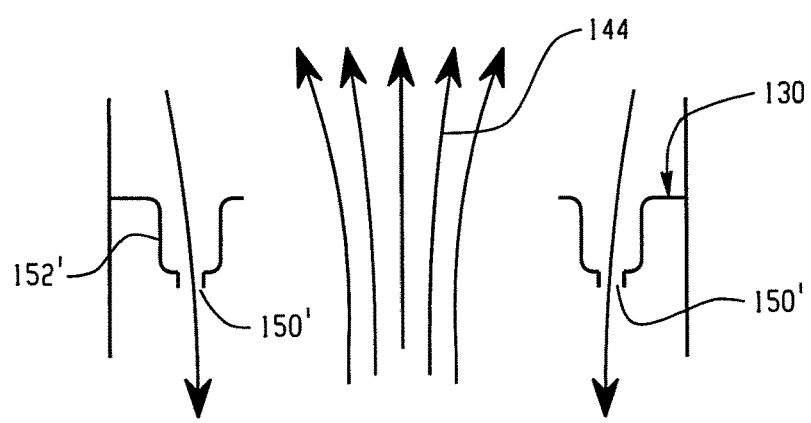
FIG. 12 is a cross-sectional view taken generally along the lines 12-12 of FIG. 11.

While the embodiment of FIGS. 5-10 situated the auxiliary openings 150 adjacent and off to one side of the main drain opening 130, it is also recognized that other patterns could be used with equal success. For example, the embodiment of FIGS. 11 and 12 provides a greater number of auxiliary openings 150' in the channel 152'. Here, the auxiliary openings 150' are still disposed adjacent the drain opening 130 and preferably extend around the entire perimeter of the drain opening.

By creating a channel adjacent the drain hole with one or more auxiliary openings, water flows into the channel, accumulates until the weight of the water exceeds the force that air puts on it through the openings on its path toward the HVAC intake. When a sufficient force or head of water builds over the auxiliary openings, the water either streams out, or intermittently flows from the channel, and the process repeats itself until all of the water is drained from the cowl region under the circumstances. The auxiliary openings provide an effective countermeasure for removing the water that collects from the cowl if snow or leaves clog the arrangement. The channel disposed adjacent to the drain hole with auxiliary openings formed therein allows the water to effectively accumulate until the weight of the water exceeds the force of the air puts on the auxiliary openings. Water can then stream continuously or intermittently and the process repeated until all the water is drained. The barrier or wall may also be used to limit turbulent water droplets from entering the HVAC intake. It'll be understood that the depth and shape of the channel must be large enough to hold an amount of water weight to overcome the air force pushing upwardly on the auxiliary drain openings. The cross-sectional area of the auxiliary openings varies with the amount of water weight (volume) and force of the airflow. The force of the airflow through the main drain varies proportionally with the blockage bond the main air intake for the HVAC system. Correlation is made between the area of the auxiliary drain openings relative to the main drain opening. The depth and shape of the channel must be large enough to hold an amount of water with a quick enough drain rate through the auxiliary openings to avoid water buildup around the main drain opening. If water does not drain from the auxiliary openings of the channel quickly enough, a wall of water could potentially build up around the main drain opening the velocity air pickup water droplets. Thus appropriately sizing the auxiliary drain openings to avoid water buildup around the mean drain opening is required. The area of the auxiliary openings with the waterway above them must be sized to overcome the force of the air pushing upwardly.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do It is claimed:

1. An air/water separator drain assembly in an associated vehicle comprising:
    an HVAC intake opening beneath a cowl through which air proceeds for use in the associated vehicle;
    a drain opening in a cowl support structure for drain ng water from the cowl in a first direction;
    a groove in the cowl support structure around the drain opening for collecting water from the cowl and to avoid the drain opening; and
    at least one auxiliary opening in the groove smaller than the drain opening for removing water from the groove and from the cowl support structure.

2. The air/water separator drain assembly of claim 1 further comprising plural auxiliary openings and each of the auxiliary openings is smaller than the drain opening.

3. The air/water separator drain assembly of claim 2 wherein the HVAC intake opening is spaced from the drain opening.

4. The air/water separator drain assembly of claim wherein the auxiliary opening is located along a periphery of the drain opening.

5. The air/water separator drain assembly of claim 1 wherein the channel has a depth that cooperates with a cross-sectional area of the auxiliary opening to assure drainage of water therethrough and thereby limit a potential for moisture to enter the HVAC intake opening.

6. An air/water separator drain assembly associated with a cowl of an automotive vehicle, the drain assembly comprising:
    an HVAC intake opening that receives air flow from a first airflow path of the cowl of the associated automotive vehicle, and receives air flow from a second airflow path when the first airflow path is at least partially blocked;
    a drain for removing water from a cowl support structure of the cowl when the HVAC intake opening receives air from the first airflow path, and the drain forming a portion of the second airflow path when the first airflow path is at least partially blocked;
    a groove in the cowl support structure surrounding a perimeter of the drain opening for collecting water from the cowl support structure and to avoid the drain opening; and
    an auxiliary opening in a bottom of the groove, the auxiliary opening being smaller than the drain opening and draining water from the groove irrespective of whether the first airflow path is blocked or not.

7. The air/water separator drain assembly of claim 6 further comprising plural auxiliary openings wherein the auxiliary openings are dimensioned to ensure water drainage therethrough even if air flows through the auxiliary openings when the first air flow path to the HVAC intake opening is at least partially blocked.

8. The air/water separator drain assembly of claim 7 wherein the auxiliary openings are disposed about an entire perimeter of the drain.

9. The air/water separator drain assembly of claim 7 wherein the auxiliary openings are disposed at a different height level than the drain.

10. The air/water separator drain assembly of claim 6 wherein a wall of the channel surrounding the drain forms a portion of the second airflow path when the first airflow path is at least partially blocked.

11. The air/water separator drain assembly of claim 6 further comprising a blocker beneath the cowl and disposed in the second airflow path between the drain and the HVAC intake opening that limits a potential for water droplets from the drain from reaching the associated intake opening when the first airflow path to the HVAC intake opening is at least partially blocked.

12. A method of separating air and water beneath a cowl comprising:
    providing an intake of a HVAC system beneath the cowl;
    providing a drain opening in a cowl support structure that serves a dual purpose of (i) draining water from a region of the cowl support structure and (ii) forming part of a secondary airflow path when a primary airflow path to the HVAC intake is at least partially blocked; and
    providing at least one auxiliary opening in the cowl support structure adjacent the drain opening that allows water to drain from the cowl support structure region when the primary airflow path to the HVAC intake is at least partially blocked and the drain opening is used as part of the secondary airflow path forming a groove at least partially around the drain opening for water to avoid the drain opening and communicating with at least one auxiliary opening, which is located in the groove.

13. The method of claim 12 wherein the dual purposes of the drain opening include draining the water from the cowl support structure region in a first direction and forming part of the secondary airflow path in an opposite, second direction.

14. The method of claim 12 further comprising positioning, a blacker in the secondary airflow path between the drain opening and the HVAC intake.

15. The method of claim 12 further comprising forming auxiliary openings around an entire perimeter of the drain opening.

* * * * *